United States Patent
Ito

(10) Patent No.: US 8,485,510 B2
(45) Date of Patent: Jul. 16, 2013

(54) FOOD PREPARATION APPARATUS

(76) Inventor: Cesar Ito, Saint Simons Island, GA (US)

(*) Notice: Subject to any disclaimer, the term of this patent is extended or adjusted under 35 U.S.C. 154(b) by 6 days.

(21) Appl. No.: 13/186,574

(22) Filed: Jul. 20, 2011

(65) Prior Publication Data

US 2012/0153554 A1 Jun. 21, 2012

Related U.S. Application Data

(60) Provisional application No. 61/423,424, filed on Dec. 15, 2010.

(51) Int. Cl.
*B23Q 3/00* (2006.01)

(52) U.S. Cl.
USPC ............ 269/289 R; 269/302.1; 269/308; 269/303

(58) Field of Classification Search
USPC ............ 269/302.1, 289 R, 303, 308
See application file for complete search history.

(56) References Cited

U.S. PATENT DOCUMENTS

| 5,100,115 | A  | * | 3/1992  | Schorn ............ 269/302.1 |
| 5,996,479 | A  | * | 12/1999 | Mittnight ............ 99/467 |
| 7,966,949 | B2 | * | 6/2011  | Willey ............ 108/44 |
| 2004/0255480 | A1 | * | 12/2004 | Gleeson ............ 33/563 |

FOREIGN PATENT DOCUMENTS

JP 09056608 A * 3/1997

* cited by examiner

*Primary Examiner* — Lee D Wilson
*Assistant Examiner* — Nirvana Deonauth
(74) *Attorney, Agent, or Firm* — Jonathan Rigdon Smith, J.D., P.C.; Jonathan R. Smith

(57) ABSTRACT

A cutting board for food preparation is equipped with a blower which can be mounted on the board in various positions to keep airborne irritants from the cut food away from the breathing zone of the preparer. A novel food guide and knife guard combination may be mounted on a grid of locations on the upper surface of the cutting board. The grid points have holes drilled through the board which provide a means for mounting the food guide and the knife guard as well as a means for draining juices from the cutting surface. A removable juice collection tray is mounted below the cutting board.

5 Claims, 3 Drawing Sheets

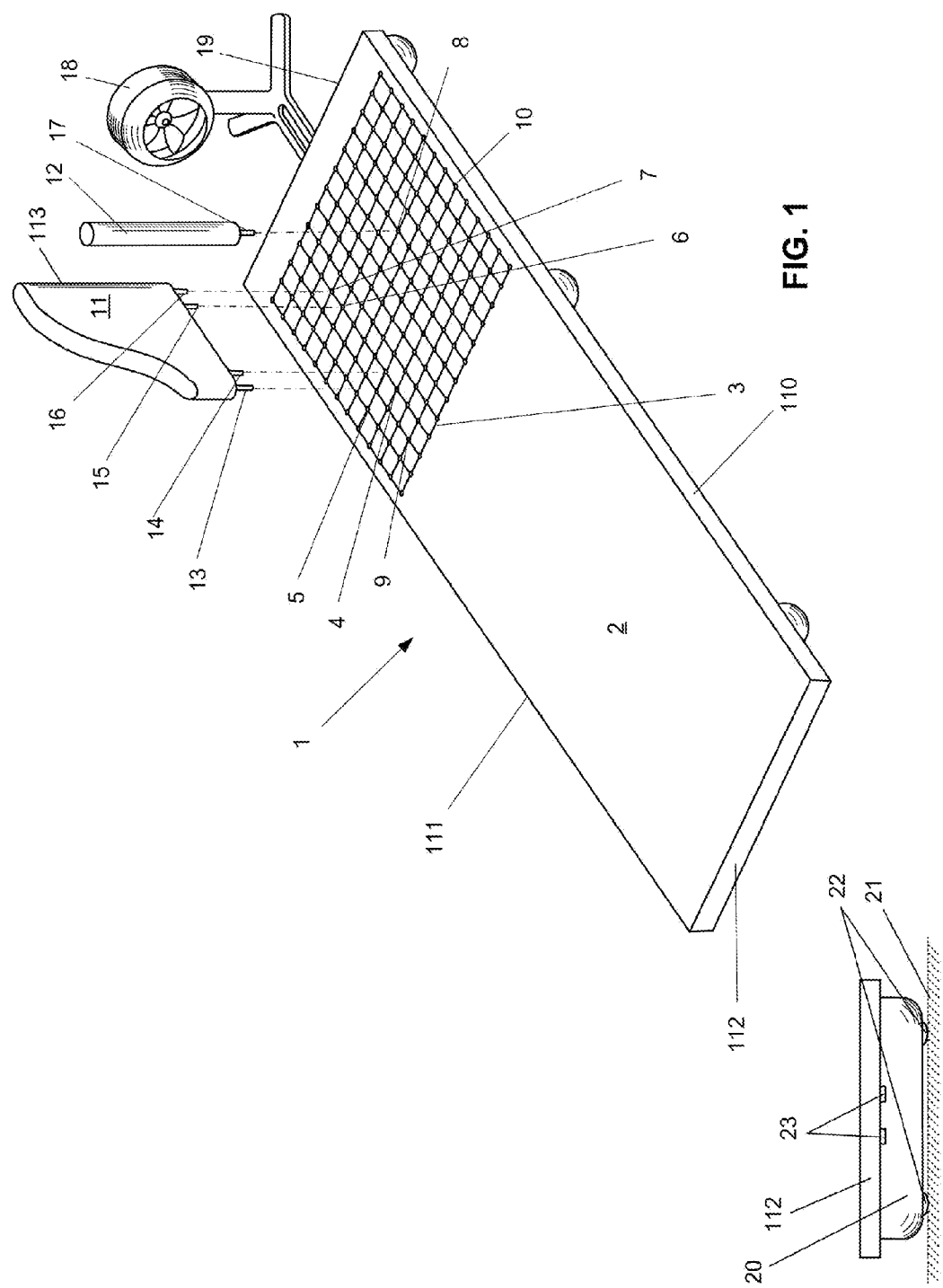

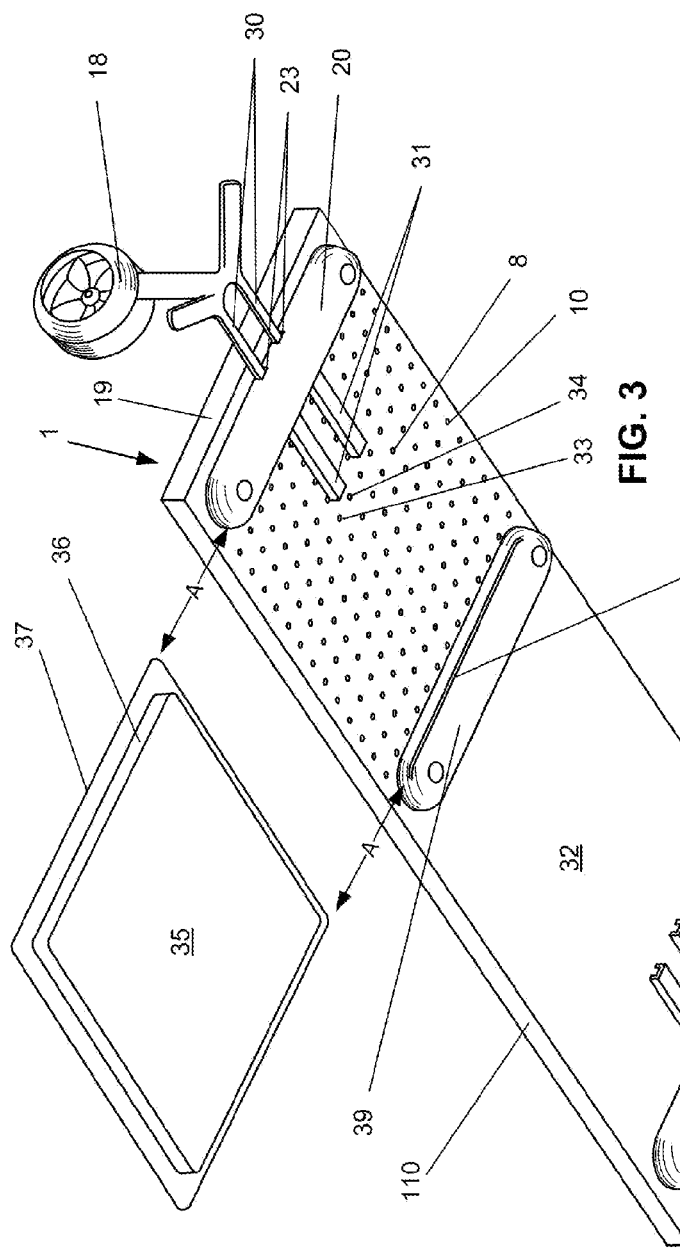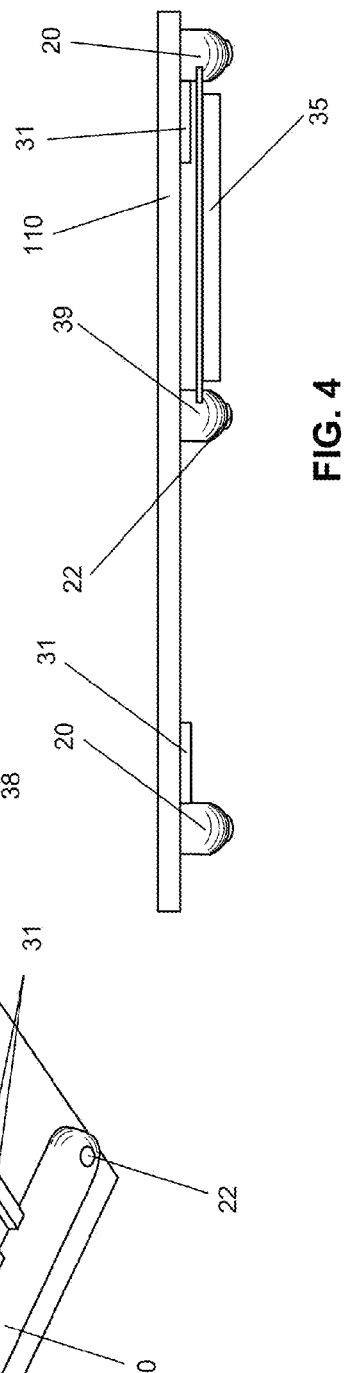

FOOD PREPARATION APPARATUS

BACKGROUND OF INVENTION

Professional cutting boards for food preparation lack optimum means for, at least, (a) control of food for accurate manual slicing in various directions for proper preparation and pleasing presentation; (b) proper collection of food juices generated during slicing for disposal or reuse; and (c) positive ventilation of the immediate slicing area to minimize a food preparer's exposure to airborne irritants. It is the object of the invention to provide these means. Further objects and advantages will become evident as described in more detail below.

BRIEF DESCRIPTION OF THE INVENTION

The instant invention is a rigid, flat, elongate cutting board made of material suitable to back the manual cutting of food, that is, to provide a durable and easily-cleaned surface that is compatible with knife blades. At least a portion of the cutting surface is provided with a printed or inlaid grid pattern as an aid to cutting reproducible thicknesses of foods items.

Vertical holes are drilled through the board at the intersection of the grid lines to permit drainage of food juices through the board into a tray optionally mounted below the board. A vertical rigid food guide and a vertical rigid knife guard are also provided, each having dowels depending therefrom which can be inserted into the top openings of the vertical holes for support.

The cutting board is also provided with means for holding the base of a blower, in a plurality of orientations that allow the blower to blow air directly across the food as it is being cut and away from the user.

BRIEF DESCRIPTION OF THE DRAWINGS

FIG. 1 is a perspective view of the preferred embodiment of the instant invention as viewed from above the right side of the invention.

FIG. 2 is both a rear end view and a front end view of the preferred embodiment.

FIG. 3 is a perspective view of the preferred embodiment as viewed from below the right side of the invention.

FIG. 4 is a right side view of the preferred embodiment.

DETAILED DESCRIPTION OF THE INVENTION

Figure 5:
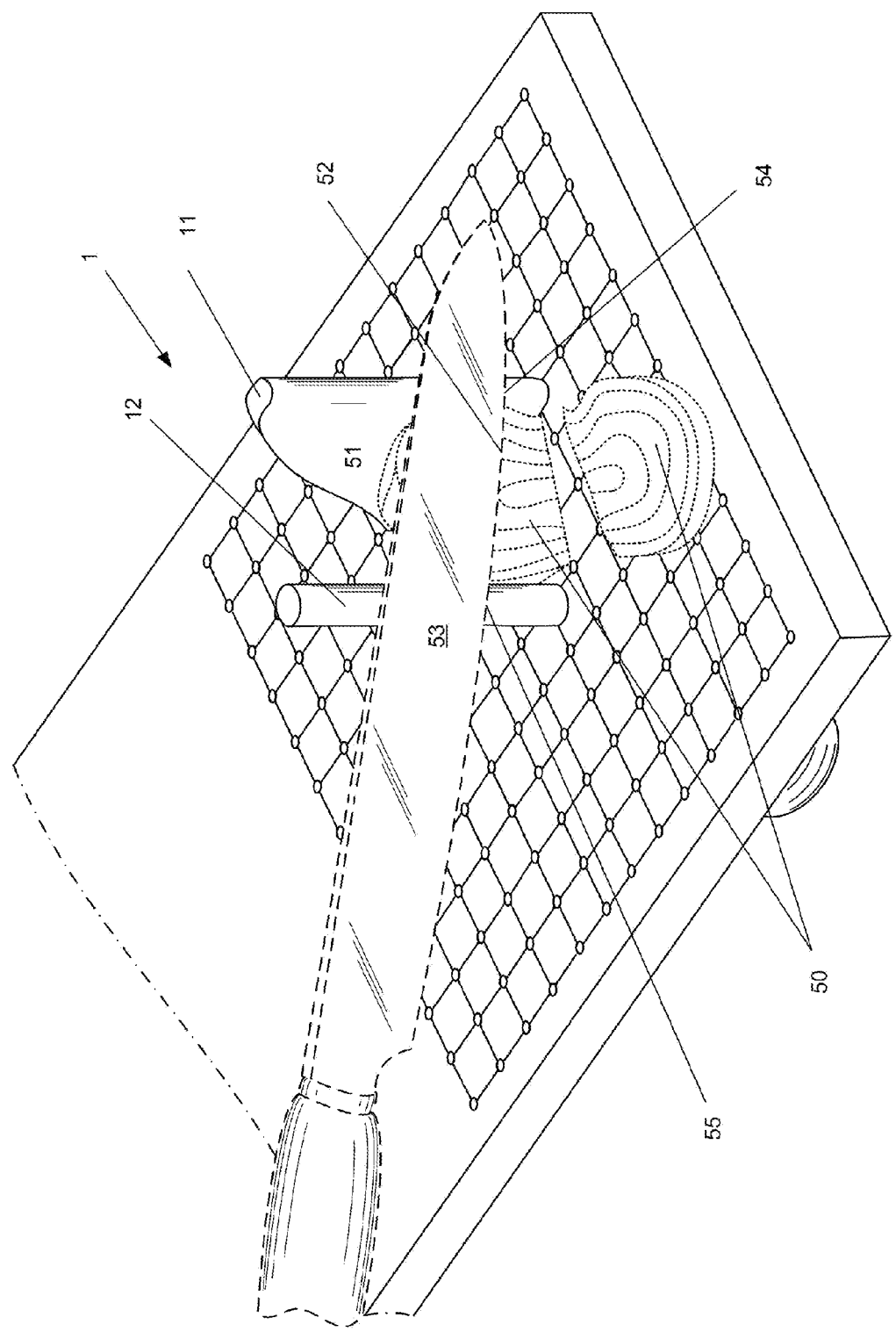
FIG. 5 depicts a typical use of the preferred embodiment.

Referring now to the drawings, in which like elements are represented by like indicia in each drawing, FIG. 1 is a perspective view of the preferred embodiment of the instant invention as viewed from above the right side 110 of the invention. A rigid, flat, elongate cutting board 1, made of material suitable to back the manual cutting of food, has an upper surface 2 upon which to cut food, at least a portion of which is provided with a printed or inlaid grid pattern 3 as an aid to cutting reproducible thicknesses of food items.

In this embodiment, the cutting board 1 is rectangular, but in other embodiments, other shapes such as, but not limited to, oval may be used. Vertical holes, e.g., 4, 5, 6, 7, 8, 9 and 10 are drilled through the board at the intersection of lines in the grid pattern 3. The grid pattern shown in this embodiment is square, but in other embodiments, other patterns such as, but not limited to, triangular may be used. A vertical rigid food guide 11 and a vertical rigid knife guard 12 are also provided, each having dowels 13, 14, 15, 16 and 17 depending therefrom which are gripped by the top openings of the vertical holes 4, 5, 6, 7, and 8, respectively, for support. The number and positioning of the dowels may be changed within the scope of this invention so long as they provide secure support for the food guide 11 and the knife guard 12 when food and a knife are pressed against them.

Holes 9 and 10 and all the rest of the holes at the grid points remain open to permit drainage of food juices through the board into a tray optionally mounted below the board (see FIG. 3). It is important for hygiene that all of the drain holes be sufficiently large and smooth-bored for complete cleaning.

A blower 18 attached to blower support means (not visible in this view) at the front end 19 of the board 1 is aimed to blow air directly at high velocity lengthwise across the upper surface 2. Unlike most kitchen vents, the blower 18 uses air emitting from the positive side of the blower to move air contaminated with food odors and irritants positively away from a user standing at either right side 110 or left side 111 of the board. The typical draft vent of most kitchens and some ranges is effective at moving large volumes of air from a food preparation environment, but applies negligible velocity to the air adjacent to food being cut and the person cutting the food.

In this embodiment, the blower 18 is preferably articulable vertically and horizontally so that it may be optimally aimed by the user.

The lower surface of the board is provided with a blower support means (see FIGS. 2 and 3) for holding the base of the blower both at the front end 19 and the rear end 112. Placement of the blower support means at other locations along the periphery of the board are within the scope of this invention.

The food guide 11 in this embodiment is elongate both in height and in the lengthwise direction of the cutting board 1. This is to ensure that it will resist the sidewards pressure on food by the user even if the item to be cut is large. The knife guard is elongate in height but is preferably not elongate in length because it is meant to provide a stop against horizontal motion of the knife blade without significantly constraining the width of the food being cut.

In this embodiment, both the forward food guide end 113 and the knife guard 12 are shown rounded so as not to grate on the blade of a knife, but in other embodiments either or both may be planar or multifaceted in the vertical direction.

FIG. 2 is both a rear end view and a front end view of the preferred embodiment minus the blower 18 (see FIG. 1). Taking FIG. 2 as a rear end view, it shows the rear end 112 of the cutting board 1 resting on a board support 20. The board end support 20 may be one piece transverse to the length of the cutting board 1, as shown, or it may be more than one piece so long as the cutting board 1 is stably supported on a flat surface 21 (shown in dashed lines as environmental structure). One or more resilient pads 22 may also be provided to protect the surface 21 and keep the cutting board 1 from rocking. A blower support means 23 is provided here, taking the form in this embodiment of a pair of slots 23 extending inwardly through the board end support 20 from the rear end 112 parallel to the length of the cutting board 1. The front end view in this embodiment is identical to the rear end view with the front end indicium 19 substituted for the rear end indicium 112.

FIG. 3 is a perspective view of the preferred embodiment as viewed from below the right side 110 of the invention. It shows the fan 18 having blower attachment means 30 attached to the blower support means 23. In this preferred embodiment, the blower attachment means takes the form of a pair of elongate tangs inserted into the pair of slots 23. The slots 23 may extend through the board end support 20 and into extensions 31 attached to the lower surface 32 of the cutting board 1 for rigidity of support. Note that in this embodiment, the extensions 31 are made narrow enough that they fall between adjacent rows of drain holes exemplified by drain holes 33 and 34.

Drain holes 8 and 10 in this figure correspond with drain holes 8 and 10 in FIG. 1, illustrating that the drain holes pass all the way through the cutting board 1.

Other embodiments of this invention may utilize one or more alternatively-shaped slots in the board end support 20, so dimensioned as to provide adequate support for the blower 18 without extensions 31. It is also possible within the scope of this invention to have the slots 23 made in the front end 19 of the cutting board 1, preferably positioned so that the corresponding blower attachment means does not obstruct any of the drain holes.

A juice collection tray 35 is provided in this preferred embodiment. It comprises a preferably square collection portion 36 surrounded by a support lip 37. The support lip 37 cooperates with transverse support grooves 38 (only one visible in this view) so that the tray 35 may be slid in and out in the direction of the arrows A underneath the cutting board 1. For this purpose, the depth of the collection portion 36 must be less than the vertical distance between the lower extremity of the resilient pads 22 and the lower surface 32 of the cutting board 1. Other means for supporting the tray 35 under the cutting board 1 that are currently known in the art are within the scope of this invention.

This figure also shows a center board support 39, the need for which depends on the length and rigidity of the cutting board 1. Like the board end supports 20, this support may consist alternatively within the scope of this invention as a plurality of supports. FIG. 4 is a right side view of the preferred embodiment minus the blower attachment. It shows all of the elements identified in the other figures that are visible in this view. The left side view of this embodiment is a mirror image of this right side view with the left side indicium 111 substituted for the right side indicium 110.

FIG. 5 depicts a typical use of the preferred embodiment. The food guide 11 has been pressed downwardly into the cutting board 1 so that the dowels fit into their corresponding holes (see FIG. 1). Food to be sliced 50 (in this case an onion, shown in dashed lines to indicate environmental structure) has been placed against the right side 51 of the food guide 11, and the knife guard 12 has been pressed downwardly on the opposite side of the food so that its dowel (again refer to FIG. 1) fits into a corresponding hole. The position of the knife guard 12 relative to the food guide 11 determines the angle of the cut. When the edge 52 of the knife 53 (again shown in dashed lines to indicate environmental structure) is placed against the food guide 11 at point 54 and against the knife guard 12 at point 55, the knife 53 will cut the food 50 along a straight line between them.

In embodiments, the cutting board 1 may also have a cutout portion through it (not shown) which would allow waste to be pushed off the surface. Embodiments may also include a food pushing device (not shown) for pushing food forwardly between the food guide 11 and the knife guard 12.

The invention claimed is:

1. A food preparation apparatus for use on a horizontal work surface, comprising:
    a rigid, substantially horizontal panel comprising
        an upper surface upon which food may be cut;
        a periphery;
        a pattern of grid points on the upper surface covering at least a portion of the upper surface;
        a plurality of vertical holes having a uniform horizontal hole dimension placed through the panel at at least some of the grid points;
        means for mounting a blower on at least one location along the periphery;
    a blower;
    a substantially vertical food guide having a means for mounting the food guide in at least one of the vertical holes; and
    a substantially vertical knife guard having a means for mounting the knife guard in at least one of the vertical holes;
        the periphery is a rectangle having a horizontal length, a perpendicular horizontal width, and a thickness:
        the pattern is a rectangular grid of grid points, each grid point separated from its adjacent grid points by a horizontal distance in one horizontal direction and by the same horizontal distance in the other perpendicular horizontal direction:
        the food guide has a substantially vertical leading edge, a substantially horizontal lower edge having a lower edge length, and a vertical surface having a guide height:
        the knife guard has a vertical guard surface, a lower end, and a guard height:
        the means for mounting the food guide is a plurality of dowels depending vertically from the lower edge and spaced along the lower edge by one or more multiples of the horizontal distance;
        the means for mounting the knife guard is a dowel depending vertically from the lower end;
            the dowels being of a diameter such that the vertical holes grip the dowels when the dowels are inserted into the holes:
    a removable tray mounted below the holes having a volume capacity for holding juices released from food during cutting:
        the blower comprises a base, the base including at least one horizontal tang:
        the means for mounting a blower is taken from the list comprising
            a. at least one horizontal slot molded in the periphery and sized to frictionally grip the at least one tang:
            b. at least one horizontal slot affixed to the bottom of the panel and sized to frictionally grip the at least one tang:
    a plurality of panel supports attached to the bottom of the panel to hold the panel above the work surface by a panel height: and
    the panel height is sufficient to accommodate the tray.

2. A food cutting board for use on a substantially horizontal work surface, comprising:
    a substantially rectangular rigid panel of material suitable for cutting food with a knife; and having
        front and rear ends defining the width of the panel, the width being about one-third the length of the panel;
        the upper surface of the panel having a rectangular grid pattern permanently placed thereon;
            the pattern occupying about one third of the upper surface area of the panel and being closer to one end of the panel than the other;
        a plurality of cylindrical holes placed vertically through the panel at the intersection points in the grid pattern;
    a blower having a base, the base comprising at least one substantially horizontal tang to support the blower at the front and rear edges of the panel so that the blower blows air across and above the upper surface of the panel;

a substantially vertical food guide having a horizontal bottom edge and a vertical leading edge;
the horizontal bottom edge having a number of vertical dowels depending therefrom to grip a number of holes;
a substantially vertical knife guard having a vertical dowel depending therefrom to grip another hole;
at least two panel supports having substantially vertical sides and being fixed to the lower surface of the panel to provide a space between the work surface and the lower surface of the panel;
a tray removably inserted in the space between the panel supports;
slots sized to receive the at least one tang being placed in a location taken from the list of
  a. the front and rear ends of the panel; and
  b. the sides of the panel supports.

3. A food preparation apparatus for use on a horizontal work surface, comprising:
a rigid, substantially horizontal panel comprising
  an upper surface upon which food may be cut;
  a periphery;
  a pattern of grid points on the upper surface covering at least a portion of the upper surface;
  means for mounting a blower on at least one location proximate to the periphery;
a blower blowing high-velocity air from the periphery across the board;
a substantially vertical food guide mounted at at least one of the grid points on the board; and
a substantially vertical knife guard mounted at at least one of the grid points on the board;
the pattern is a rectangular grid of grid points, each grid point separated from its adjacent grid points by a horizontal distance in one horizontal direction and by a horizontal distance in another horizontal direction;
the food guide has a substantially vertical leading edge, a substantially horizontal lower edge having a lower edge length, and a substantially vertical surface having a guide height; and
the knife guard has a substantially vertical guard surface, a lower end, and a guard height.

4. A food preparation apparatus for use on a horizontal work surface, comprising:
a rigid, substantially horizontal panel comprising
  an upper surface upon which food may be cut;
  a periphery;
  a plurality of grid points on the upper surface;
  means for mounting a blower on at least one location proximate to the periphery;
a blower blowing high-velocity air from the location across the board; and
a substantially vertical knife guard mounted at at least one of the grid points on the board;
the knife guard having a substantially vertical guard surface.

5. The food preparation apparatus of claim 4, comprising:
a substantially vertical food guide mounted at at least one of the grid points on the board;
the food guide having a substantially vertical leading edge and a substantially vertical surface.

* * * * *